Patented Feb. 6, 1934

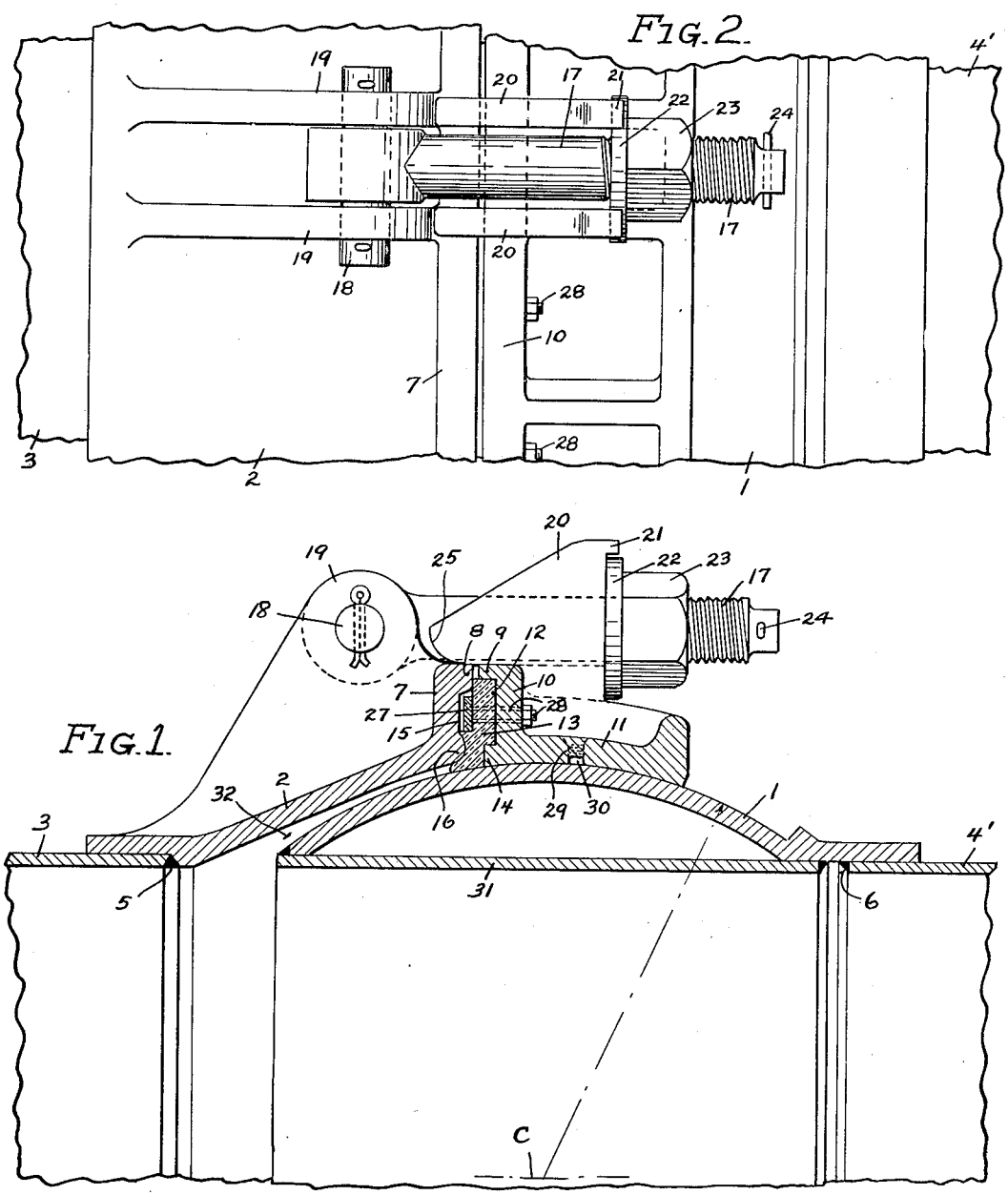

1,946,110

UNITED STATES PATENT OFFICE 1,946,110

UNIVERSAL PIPE JOINT

Sidney G. Plummer, Oakland, Calif.

Application April 18, 1933. Serial No. 666,643

11 Claims. (Cl. 285—91)

This invention relates to universal pipe joints as used for large pipes such as suction dredge work, water mains, etc., which are laid on unstable foundations, submerged in waters, etc., and require a flexible joint. The objects of the invention are to effect improvements in a metal ball pipe joint of the type shown in U. S. Patent 1,397,145 of November 15, 1921, whereby a better and more durable gasket seal is produced and the pipe sections carrying the joints may be coupled or bolted together without injury to the gasket. Other advantages of the construction will appear in the following description and accompanying drawing.

In the drawing Fig. 1 is a longitudinal central section taken through one side of my improved pipe joint shown not quite drawn up tightly by the coupling bolts.

Fig. 2 is a plan view of a portion of the joint showing one set of the eye bolt lugs.

Since this type of joint may be secured to the pipe ends by means of bolting flanges, screw threading, or welding, the latter is shown as the example in the drawing and in which the inner and outer joint members 1 and 2, respectively termed "ball" and "bell" herein, are welded to the ends of steel pipes 3 and 4 as at 5 and 6. The ball member is a hollow spherical shell generally of cast steel nicely machined or finished on its outer surface on a curve struck from a point on the center line C of the pipe line, while the bell member 2, also preferably of cast steel, is formed with an interior opening somewhat larger than the ball so as to freely clear its outer surface as indicated in the drawing and is provided with an outwardly projecting circumferential flange 7 at its outer end having a forwardly extending outer margin 8 adapted to seat against a similar margin 9 on the outer edge of a flange 10 of a relatively wide band or socket ring 11 which is also of cast steel finished interiorly to form a nice working fit over the ball. This ring is fitted in place by expanding with heat to pass over the ball curvature and shrunk onto the ball so as to preserve a working fit yet prevent it from removal in an axial direction. This particular feature of shrinking the socket ring over the ball to a working fit is not new as it is shown and claimed in the U. S. patent before mentioned, and is not necessary to the present improvements, as it may be transversely split and bolted together over the ball if desired.

Flange 10 of the socket ring is formed with a relatively deep circular flat-bottomed channel 12 on its inner face in which is seated a special gasket ring 13, and the outer margin or wall 9 of the channel projects in advance of the inner wall 14 as indicated, while the confronting face of flange 7 is similarly formed except that its circular channel 15 is of lesser breadth and depth than the gasket channel in flange 10 and its inner wall does not protrude much but takes the form of a rounding lip 16 spaced some distance from inner wall 14 of channel 12.

Bell member 2 and socket ring 11 are adapted to be clamped together with their flange margins 8 and 9 in contact by means of eye bolts 17 spaced around the joint. These bolts are pivoted at 18 between lugs 19 cast on the bell member and when in bolting position they lie parallel to the axis of the pipe each between a pair of lugs 20 cast on the socket ring. Lugs 20 are formed with projecting outer ends 21 to overhang washers 22 under the bolt nuts 23 so that a bolt could not be accidentally forced out in case its nut happened to become loosened, while cotter pins 24 at the extreme turned down ends of the bolts prevent accidental loss of the nuts through too far unscrewing. Lugs 20, it should be noted, are formed to project over flange 10 and beyond flange 9 so as to center bell member 2 with respect to the ball member 1 and are also formed with outwardly curved noses 25 to facilitate entry of the parts when the two pipe ends are brought together for coupling.

The gasket ring 13 seated within circular channel 12 is preferably of resilient rubber and, as indicated in Fig. 1, is thicker than the depth of the channel so that it must be compressed into the channel when the eye bolts are drawn up tight, and the gasket ring is shaped with a step in it as well as a curved seat for rounding lip 16 of the bell member so that it will initially seat both along this lip as well as along the outer margin of the bell member, and the effect of the rounding lip 16 is to force the inner edge of the gasket tightly against the outer surface of the ball. A feature of greatest importance is the provision of a flat metal ring 27 fitting in the step of the gasket and of a thickness and width to normally be cleared by the flange 7 of the bell. This flat metal ring is held in place by a circle of countersunk head bolts 28 passing freely through gasket and flange 10 and fitted with tight nuts, all so that while the gasket is thus bolted into the channel 12 of the socket ring flange, it is free to be compressed or expand to the limits determined by the original drawing up of bolts 28.

Before this flat metal ring was adopted much difficulty was found in assembling the pipe sections, especially if on separate barges for dredger work as the bumping of the ends together in trying to couple the large heavy pipes, sometimes two or three feet in diameter, would frequently destroy the gasket by literally cutting it in two, whereas by this improvement it cannot be injured regardless of the angular position ring 11 might be in when the coupling of the pipes is undertaken.

After the joint is connected grease is forced into it or a grease channel 30 formed inside of ring 11, at one or more threaded holes as at 29 by means of a high pressure grease gun, and the holes plugged.

Another feature of the joint is the provision of a steel bore tube 31 welded at its ends within the hollow ball shell 1 which has the effect of continuing the straight bore to overcome swirling of the liquids passing through.

The free space 32 between the bell and ball permits the liquid mass or pressure to act upon the thin flexible inner edge of the gasket and force it all the more tightly against the outer surface of the ball.

Instead of welding the joints to the line pipes as indicated, it is manifest they could be threaded when small pipes are used, or provided with bolting flanges as well-known in the art.

Having thus described the improved construction of my universal pipe joint, what I claim is:—

1. A universal pipe joint comprising an inner ball member adapted to be attached to the end of one pipe section, an outer bell member adapted to be attached to the end of the other pipe section, and a socket ring member engaged over the outside of the ball member with a working fit around its largest diameter, outwardly extending circumferential flanges on said socket ring and bell members in confronting relation and annularly recessed within in confronting relation, a resilient gasket ring within the recess in contact with both flanges, a metal ring upon one face of the gasket ring secured thereagainst by means passing into one of said flanges, and means for clamping said flanges together and against opposite sides of said gasket ring.

2. In a structure as specified in claim 1, the metal ring against the gasket being entirely clear of contact with either flange.

3. A universal pipe joint comprising an inner ball membed adapted to be attached to the end of one pipe section, an outer bell member adapted to be attached to the end of the other pipe section, a socket ring member engaged over the outside of the ball member with a working fit around its largest diameter, outwardly extending circumferential flanges on said socket ring and bell members in confronting relation and annularly recessed within in confronting relation, a resilient gasket ring within the recess in contact with both flanges and the outer surface of the ball member, a metal ring upon one face of the gasket ring secured thereagainst by bolts passing through one of said flanges, means for holding said flanges in concentric relation, and means for clamping said flanges together.

4. A universal pipe joint comprising a ball member for the end of one pipe, a socket ring operatively engaged over the largest diameter of the ball, a bell member for the end of the other pipe extending partially over the ball, and means for clamping the bell member to said socket ring, and a resilient gasket ring in contact at opposite sides with and clamped between confronting faces of the bell member and socket ring and secured to the clamping face of said socket ring for handling with the ring and ball member as a unit in coupling the joint.

5. A universal pipe joint comprising a ball member for the end of one pipe, a socket ring operatively engaged over the largest diameter of the ball, a bell member for the end of the other pipe extending partially over the ball, means for clamping the bell member to said socket ring, a resilient gasket ring in contact at opposite sides with and clamped between confronting faces of the bell member and socket ring and secured to the clamping face of said socket ring, and a metal guard ring on the outer side of said gasket ring also secured to said socket ring for handling with the ring and ball member as a unit in coupling the joint.

6. In a universal pipe joint having a ball member for the end of one pipe with a socket ring operatively engaged over the largest diameter of the ball, a bell member for the end of the other pipe adapted to overlap the free end of the ball member and attach to the socket member, meeting faces on said socket ring and bell member and peripheral bolts for drawing them together, the meeting face of said socket ring formed with an annular channel, and a resilient gasket ring secured in said channel in a manner to present opposite faces to confronting faces of the ring and bell members and for handling as a unit with the ring and ball member in coupling the joint.

7. In a universal pipe joint having a ball member for the end of one pipe with a socket ring operatively engaged over the largest diameter of the ball, a bell member for the end of the other pipe adapted to overlap the free end of the ball member and attach to the socket member, meeting faces on said socket ring and bell member and peripheral bolts for drawing them together, the meeting face of said socket ring formed with an annular channel, a resilient gasket ring secured in said channel, said gasket ring formed with a step in its outer side and a metal ring seated in said step and held in place by means securing the gasket in place.

8. In a structure as specified in claim 6, said meeting faces formed to overlie the gasket ring and contact along their outer margins, and the bell member formed with an inner rounding annular lip seated against the gasket and forcing its inner edge against the outer surface of said ball.

9. In a structure as specified in claim 6, the socket ring and bell member constituting the two outer members of the joint, and lugs formed on one of said outer members overhanging the other outer member for centering the same and flared outwardly at their ends to facilitate aligning of the members in coupling the same.

10. A universal joint for connecting the ends of two pipes comprising a ball-shaped member for the end of one pipe, a bell-shaped member for the end of the other pipe extending part way over the ball member, a socket-ring encircling and overlying and fitting over the crown of the ball, said socket-ring and bell-shaped member provided with confronting flanges bolted together, a compressed resilient gasket ring between said flanges seated in an annular recess in one of them, and impinged by the other flange at spaced concentric lines, said other flange being annularly recessed between said lines.

11. A universal joint for connecting the ends of two pipes comprising a ball-shaped member for the end of one pipe, a bell-shaped member for the end of the other pipe extending part way over the ball member, a socket-ring encircling and overlying and fitting over the crown of the ball, said socket-ring and bell-shaped member provided with confronting flanges bolted together, a compressed resilient gasket ring between said flanges seated in an annular recess in one of them, and impinged by the other flange at spaced concentric lines, said other flange being annularly recessed between said lines, and a flat metal ring positioned against the gasket opposite the recess in said other flange and free of contact therewith, and bolted through the gasket and first-mentioned flange.

SIDNEY G. PLUMMER.